United States Patent
Hirota et al.

(10) Patent No.: US 12,339,984 B2
(45) Date of Patent: Jun. 24, 2025

(54) MANAGEMENT APPARATUS, CONTROL METHOD, COMPUTER READABLE MEDIUM, AND ACCESS CONTROL SYSTEM

(71) Applicants: NEC Corporation, Tokyo (JP); NEC Solution Innovators, Ltd., Tokyo (JP)

(72) Inventors: Takumi Hirota, Tokyo (JP); Morimichi Kojima, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 300 days.

(21) Appl. No.: 18/009,385

(22) PCT Filed: Jun. 11, 2020

(86) PCT No.: PCT/JP2020/023081
§ 371 (c)(1),
(2) Date: Dec. 9, 2022

(87) PCT Pub. No.: WO2021/250863
PCT Pub. Date: Dec. 16, 2021

(65) Prior Publication Data
US 2023/0222238 A1 Jul. 13, 2023

(51) Int. Cl.
*G06F 21/00* (2013.01)
*G06F 21/60* (2013.01)
(Continued)

(52) U.S. Cl.
CPC ........ *G06F 21/6218* (2013.01); *G06F 21/602* (2013.01); *H04L 9/0861* (2013.01)

(58) Field of Classification Search
None
See application file for complete search history.

(56) References Cited

FOREIGN PATENT DOCUMENTS

JP 2007219619 A * 8/2007
JP 2008-276376 A 11/2008
(Continued)

OTHER PUBLICATIONS

International Search Report for PCT Application No. PCT/JP2020/023081, mailed on Sep. 29, 2022.
(Continued)

*Primary Examiner* — Andrew J Steinle
(74) *Attorney, Agent, or Firm* — Sughrue Mion, PLLC

(57) ABSTRACT

Access right information (20) indicating an access right of a user for a target file (10) is stored in a storage device (3100) accessible from a server apparatus (3000). A management apparatus (4000) acquires the access right information (20) from the server apparatus (3000) and puts it in a storage device (4100). The management apparatus (4000) acquires a request for key information that is used to decrypt a target file (10) from a user apparatus (2000) operated by a target user (40). The management apparatus (4000) determines, upon the acquisition of the request, whether or not the target user (10) has an access right for the target file (40) by using the access right information (20) stored in the storage device (4100). The management apparatus (4000) outputs the key information to the user apparatus (2000) when it is determined that the target user (40) has the access right for the target file (10).

20 Claims, 7 Drawing Sheets

(51) Int. Cl.
    *G06F 21/62*     (2013.01)
    *H04L 9/08*     (2006.01)

(56) References Cited

FOREIGN PATENT DOCUMENTS

| | | |
|---|---|---|
| JP | 2010-129036 A | 6/2010 |
| JP | 2011076378 A * | 4/2011 |
| WO | 2017/064780 A1 | 4/2017 |
| WO | 2017/064781 A1 | 4/2017 |

OTHER PUBLICATIONS

JP Office Action for JP Application No. 2022-530467, mailed on Apr. 23, 2024 with English Translation.

* cited by examiner

MANAGEMENT APPARATUS, CONTROL METHOD, COMPUTER READABLE MEDIUM, AND ACCESS CONTROL SYSTEM This application is a National Stage Entry of PCT/JP2020/023081 filed on Jun. 11, 2020, the contents of all of which are incorporated herein by reference, in their entirety.

TECHNICAL FIELD

The present invention relates to control of access to files.

BACKGROUND ART

Technologies for enabling a plurality of users to share files through a network are being developed. Further, in such file sharing, encryption of files and control of access thereto based on the access right therefor are performed in order to prevent unauthorized use or the like of the files.

As prior-art literature disclosing a technology for realizing management of such shared files, for example, there is PTL1. PTL1 discloses a system for controlling access to a file by a user device. When the user device accesses an encrypted shared file, it requests a decryption key from a management server. Upon receiving the request, the management server acquires, from an associated server, information about the access right for a shared folder in which the shared file is stored. The management server transmits a decryption key and the information about the access right to the user device. The user device uses the shared file by using the acquired decryption key in accordance with the access right indicated in the acquired information about the access right.

CITATION LIST

Patent Literature

Patent Literature 1: International Patent Publication No. WO2017/064780

SUMMARY OF INVENTION

Technical Problem

The management server disclosed in PTL1 acquires information about an access right from the associated server at a timing at which it receives a request from the user device. Therefore, the time it takes to respond to the request from the user device is long. As a result, access to a file by a user takes a long time.

The present invention has been made in view of the above-described problem, and an object thereof is to provide a technology for reducing the time required for access to a file in an environment in which files are shared by using a server.

Solution to Problem

A management apparatus according to the present invention includes: a storage processing unit configured to acquire access right information from a server apparatus configured to manage the access right information, and put the acquired access right information in a second storage device, the access right information indicating an access right of a user for each file stored in an encrypted state in a first storage device; an acquisition unit configured to acquire a request for key information that is used to decrypt a target file from a user apparatus operated by a target user; a determination unit configured to determine, upon the acquisition of the request, whether or not the target user has an access right for the target file by using the access right information stored in the second storage device; and an output unit configured to output the key information to the user apparatus when it is determined that the target user has the access right for the target file.

A control method according to the present invention is performed by a management apparatus. The control method includes: a storage processing step of acquiring access right information from a server apparatus configured to manage the access right information, and putting the acquired access right information in a second storage device, the access right information indicating an access right of a user for each file stored in an encrypted state in a first storage device; an acquisition step of acquiring a request for key information that is used to decrypt a target file from a user apparatus operated by a target user; a determination step of determining, upon the acquisition of the request, whether or not the target user has an access right for the target file by using the access right information stored in the second storage device; and an output step of outputting the key information to the user apparatus when it is determined that the target user has the access right for the target file.

A computer readable medium according to the present invention stores a program for causing a management apparatus according to the present invention to perform a control method according to the present invention.

An access control system according to the present invention includes a user device, a server apparatus, and a management apparatus.

The user apparatus transmits a request for key information that is used to decrypt a target file accessed by a target user.

The management apparatus comprises: a storage processing unit configured to acquire access right information from the server apparatus and put the acquired access right information in a second storage device, the access right information indicating an access right of a user for each file stored in an encrypted state in a first storage device; an acquisition unit configured to acquire the request from the user apparatus; a determination unit configured to determine, upon the acquisition of the request, whether or not the target user has an access right for the target file by using the access right information stored in the second storage device; and an output unit configured to output the key information to the user apparatus when it is determined that the target user has the access right for the target file.

The user apparatus decrypts the target file by using the key information output from the management apparatus.

Advantageous Effects of Invention

A technology for reducing the time required for access to a file in an environment in which files are shared by using a server is provided.

EXAMPLE EMBODIMENT

Figure 1:
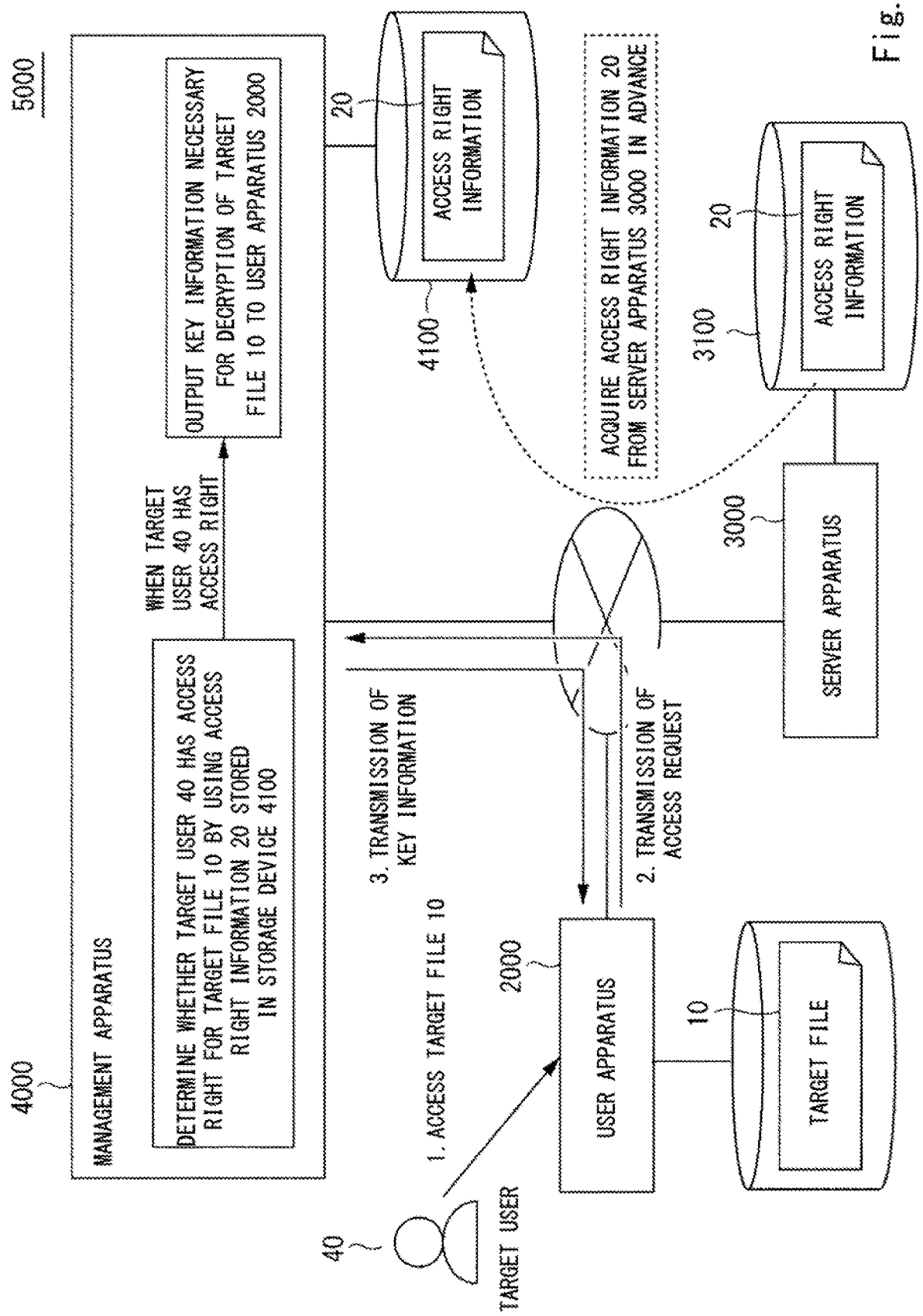
FIG. 1 shows an example of an overview of operations performed by a management apparatus according to a first example embodiment.

An example embodiment according to the present disclosure will be described hereinafter in detail with reference to the drawings. The same reference numerals (or symbols) are assigned to the same or corresponding components throughout the drawings, and redundant descriptions thereof are omitted as appropriate for clarifying the explanation.

FIG. 1 shows an example of an overview of operations performed by a management apparatus 4000 according to a first example embodiment. Note that FIG. 1 is a diagram for facilitating understanding of the overview of the management apparatus 4000, and the operations performed by the management apparatus 4000 are not limited to those shown in FIG. 1.

The management apparatus 4000, together with a user apparatus 2000 and a server apparatus 3000, constitutes an access control system 5000. In the access control system 5000, access to a file made by the user apparatus 2000 is controlled based on the access right thereof.

Note that among the files accessed by the user apparatus 2000, a file for which access control using the access control system 5000 is performed is called a target file 10. The storage device in which the target file 10 is stored may be any storage device accessible from the user apparatus 2000, and may be disposed either inside or outside the user apparatus 2000.

Further, the target file 10 is stored in an encrypted state in the storage device. Therefore, in the access control system 5000, in addition access to the target file 10 being controlled therein, the decryption of the target file 10 is also performed therein.

The user apparatus 2000 is an apparatus that is used by a user and accesses the target file 10. Note that the user using the user apparatus 2000 is called a target user 40. The access to the target file 10 may be performed in response to an operation performed by the target user 40, or may be automatically performed by software running on the user apparatus 2000. FIG. 1 shows an example case in which access to the target file 10 is performed in response to an operation performed by the target user 40.

The server apparatus 3000 is an apparatus that creates and manages information about the access right for the target file 10 (hereinafter, called access right information 20). The access right information 20 is stored in a storage device 3100, which is a storage device accessible from the server apparatus 3000.

The management apparatus 4000 is a server apparatus that manages information necessary for decrypting the target file 10. Further, the management apparatus 4000 acquires the access right information 20 from the server apparatus 3000 and puts the acquired access right information 20 in a storage device 4100, which is a storage device accessible from the management apparatus 4000.

When the target file 10 is used in the user apparatus 2000, the user apparatus 2000 transmits, to the management apparatus 4000, a request (hereinafter, called an access request) for information necessary for decrypting the target file 10 (hereinafter, called key information). In response to the access request, the management apparatus 4000 determines whether or not the target user 40 has a right to access the target file 10 (i.e., an access right for the target file 10). To make this determination, the management apparatus 4000 uses the access right information 20 stored in the storage device 4100.

When the target user 40 has the access right for the target file 10, the management apparatus 4000 provides the key information to the user apparatus 2000. The user apparatus 2000 decrypts the target file 10 by using the key information. The key information contains, for example, a decryption key for decrypting the target file 10. In this case, the user apparatus 2000 decrypts the target file 10 by using the decryption key contained in the key information. However, the data contained in the key information is not limited to the decryption key.

Example of Advantageous Effect

In this example embodiment, in the management apparatus 4000 that provides key information necessary to decrypt the target file 10 to the user apparatus 2000, it is determined whether or not the target user 40 has an access right for the target file 10 before providing the key information. Note that the management apparatus 4000 acquires the access right information 20 used for the above-described determination from the server apparatus 3000 in advance, and puts the acquired access right information 20 in the storage device 4100 accessible from the management apparatus 4000. Therefore, the management apparatus 4000 does not need to access the server apparatus 3000 when it determines whether or not the user has the access right. Therefore, the time required to determine whether or not the user has the access right is reduced as compared with the case where it is necessary to access the server apparatus 3000 each time when determining whether or not the user has the access right. As a result, the time required for accessing the target file 10 is reduced.

Further, in this example embodiment, since the access right information 20 has been acquired in advance, the management apparatus 4000 does not need to acquire the access right information 20 each time when it receives an access request. Therefore, there is another advantage that the loads on the server apparatus 3000 and the management apparatus 4000 can be reduced.

The user apparatus 2000 according to this example embodiment will be described hereinafter in a more detailed manner.

Example of Functional Configuration

Figure 2:
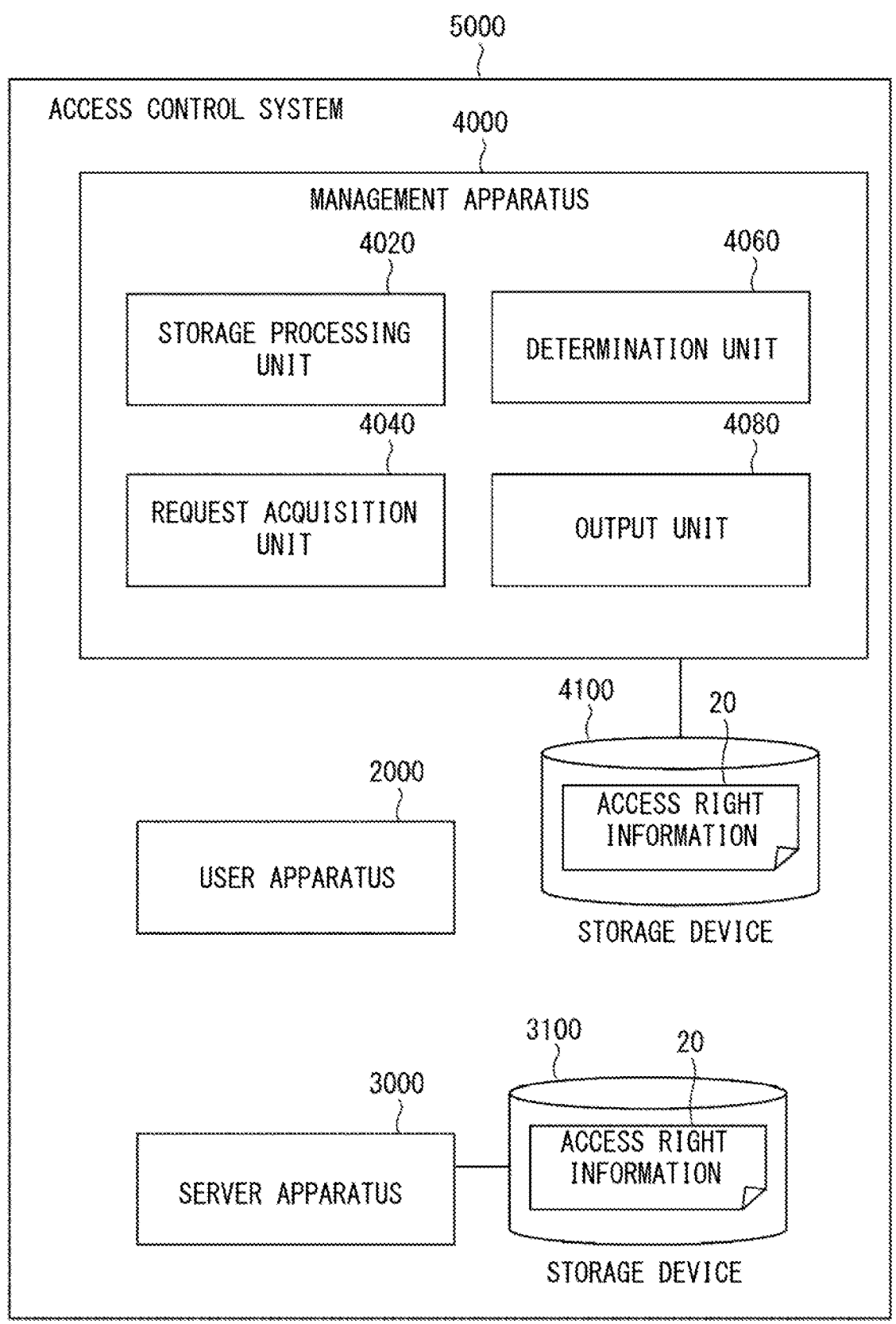
FIG. 2 is a block diagram showing an example of a functional configuration of the management apparatus according to the first example embodiment.

FIG. 2 is a block diagram showing an example of a functional configuration of the management apparatus 4000 according to the first example embodiment. As described above, the management apparatus 4000, together with the user apparatus 2000 and the server apparatus 3000, constitutes the access control system 5000. The management apparatus 4000 includes a storage processing unit 4020, a request acquisition unit 4040, a determination unit 4060, and an output unit 4080.

The storage processing unit 4020 acquires access right information 20 from the server apparatus 3000 and puts the acquired access right information 20 in the storage device 4100. The request acquisition unit 4040 acquires, from the user apparatus 2000, an access request that requests key information for the target file 10. Upon the acquisition of the access request, the determination unit 4060 determines whether or not the target user 40 has an access right for the target file 10 by using the access right information 20 stored in the storage device 4100. When it is determined that the target user 40 has the access right for the target file 10, the output unit 4080 outputs the key information to the user apparatus 2000.

Example of Hardware Configuration

Each functional component of the management apparatus 4000 may be implemented by hardware (e.g., a hard-wired electronic circuit) that realizes the functional component, or by a combination of hardware and software (e.g., a combination of an electronic circuit and a program for controlling the electronic circuit). An example case where each functional component of the management apparatus 4000 is implemented by a combination of hardware and software will be further described hereinafter.

Figure 3:
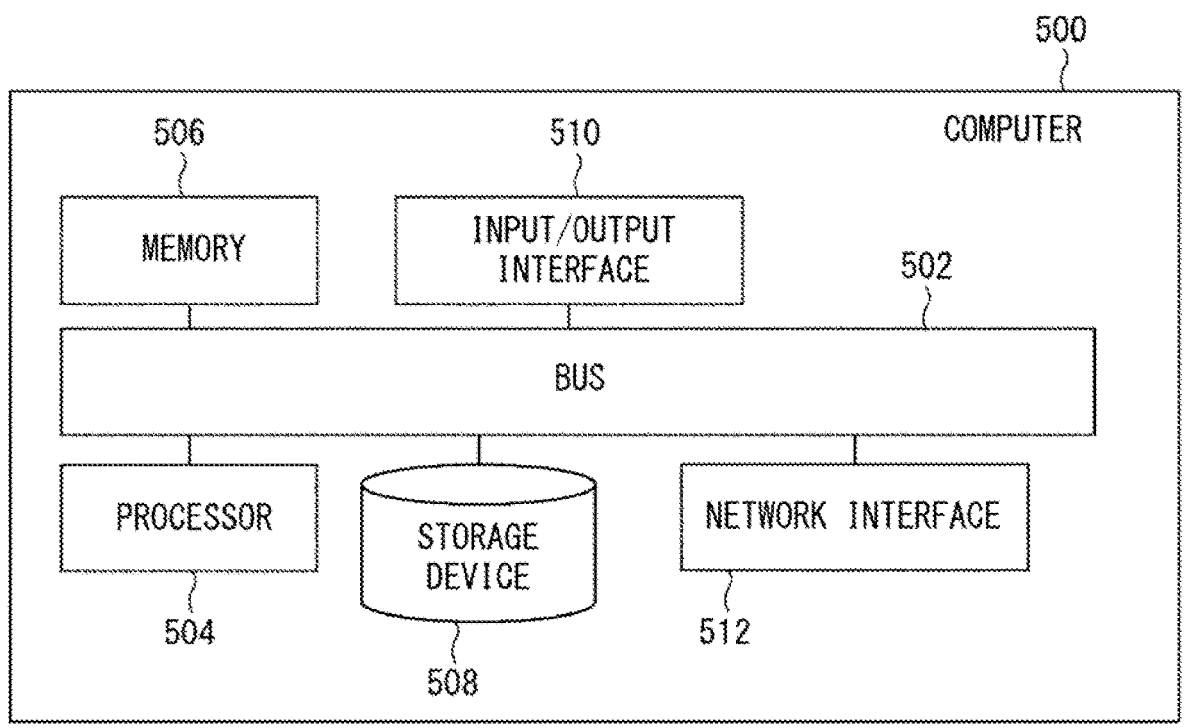
FIG. 3 is a block diagram showing an example of a hardware configuration of a computer that implements a management apparatus.

FIG. 3 is a block diagram showing an example of a hardware configuration of a computer 500 that implements the management apparatus 4000. The computer 500 is any type of computer. For example, the computer 500 is a stationary computer such as a PC (Personal Computer) or a server machine. Alternatively, the computer 500 is, for example, a mobile computer such as a smartphone or a tablet device. The computer 500 may be a special-purpose computer designed to implement the management apparatus 4000, or may be a general-purpose computer.

For example, each function of the management apparatus 4000 is implemented by the computer 500 by installing a certain application in the computer 500. The aforementioned application is implemented by a program for implementing the functional components of the management apparatus 4000.

The computer 500 includes a bus 502, a processor 504, a memory 506, a storage device 508, an input/output interface 510, and a network interface 512. The bus 502 is a data transmission path through which the processor 504, the memory 506, the storage device 508, the input/output interface 510, and the network interface 512 transmit and receive data to and from each other. However, the method for connecting the processor 504 and the like to each other is not limited to connections through buses.

The processor 504 is one of various types of processor such as a CPU (Central Processing Unit), a GPU (Graphics Processing Unit), or an FPGA (Field-Programmable Gate Array). The memory 506 is a primary storage device implemented by using a RAM (Random Access Memory) or the like. The storage device 508 is a secondary storage device implemented by using a hard disk drive, an SSD (Solid State Drive), a memory card, or a ROM (Read Only Memory).

The input/output interface 510 is an interface for connecting the computer 500 with an input/output device(s). For example, an input device such as a keyboard and an output device such as a display device are connected to the input/output interface 510.

The network interface 512 is an interface for connecting the computer 500 to a network. The network may be a LAN (Local Area Network) or a WAN (Wide Area Network).

The storage device 508 stores a program for implementing each functional component of the management apparatus 4000 (a program for implementing the above-described application). The processor 504 implements each functional component of the management apparatus 4000 by loading the program into the memory 506 and executing the loaded program. Further, the access right information 20 may be stored in the storage device 508. In this case, the storage device 4100 is implemented by the storage device 508. However, the storage device 4100 may be implemented by a storage device other than the storage device 508.

The management apparatus 4000 may be implemented by one computer 500, or may be implemented by a plurality of computers 500. In the latter case, the configurations of the computers 500 do not necessarily have to be identical to each other, i.e., may be different from each other.

Similarly to the management apparatus 4000, each of the user apparatus 2000 and the server apparatus 3000 may be implemented by various types of computers. Each of the computer that implements the user apparatus 2000 and the computer that implements the server apparatus 3000 has, for example, the hardware configuration shown in FIG. 3 like the computer 500 that implements the management apparatus 4000. However, the hardware configurations of the computers implementing the user apparatus 2000, the server apparatus 3000, and the management apparatus 4000 may be different from one another. Further, each of the user apparatus 2000 and the server apparatus 3000 may be implemented by a plurality of computers.

The computers implementing the user apparatus 2000, the server apparatus 3000, and the management apparatus 4000 are connected to each other through a network so that they can communicate with each other. The network connecting them to each other may be a LAN or a WAN. Further, two of these three apparatuses may be connected to each other by a LAN, and they may be connected to the remaining one through a WAN. For example, the server apparatus 3000 and the management apparatus 4000 are provided in the same LAN, and the user apparatus 2000 is connected to the server apparatus 3000 and the management apparatus 4000 through a WAN.

Flow of Processes

Figure 4:
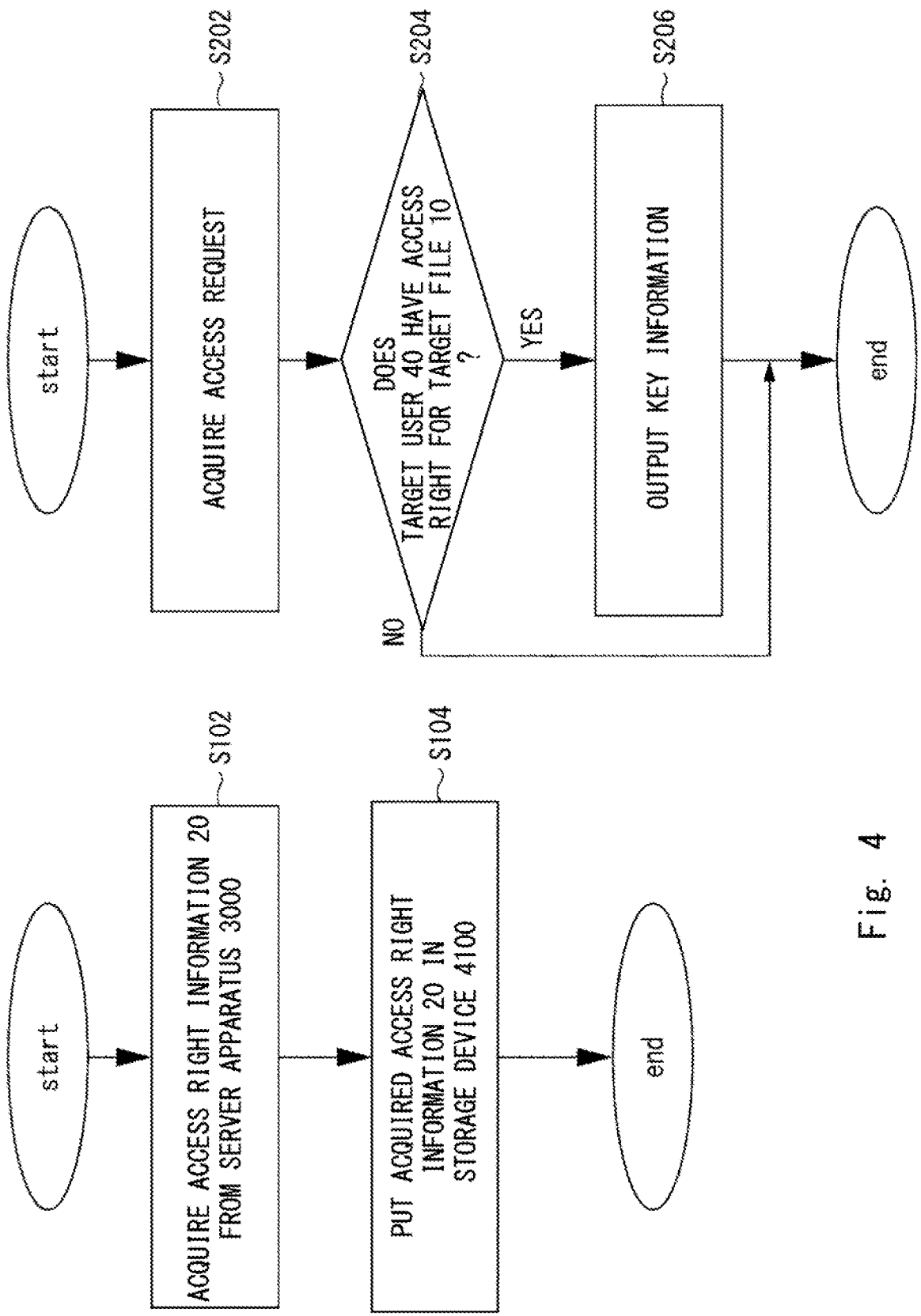
FIG. 4 is a flowchart showing an example of a flow of processes performed by the management apparatus according to the first example embodiment.

FIG. 4 is a flowchart showing an example of a flow of processes performed by the management apparatus 4000 according to the first example embodiment. Note that FIG. 4 shows two flowcharts. The flowchart on the left side shows a process for acquiring access right information 20. Meanwhile, the flowchart on the right side shows a flow of processes that are performed when an access request is acquired from the user apparatus 2000.

First, the flowchart on the left side will be described. The storage processing unit 4020 acquires access right information 20 from the server apparatus 3000 (S102). The storage processing unit 4020 puts the acquired access right information 20 in the storage device 4100 (S104).

Next, the flowchart on the right side will be described. The request acquisition unit 4040 acquires an access request from the user apparatus 2000 (S202). Upon the acquisition of the access request, the determination unit 4060 determines whether or not the target user 40 has an access right for the target file 10 by using the access right information 20 stored in the storage device 4100 (S204). When it is determined that the target user 40 has the access right for the target file 10 (S204: Yes), the output unit 4080 outputs key information to the user apparatus 2000 (S206).

Note that the process that is performed when it is determined that the target user 40 does not have the access right for the target file 10 (S204: No) is arbitrarily determined. For example, the management apparatus 4000 transmits, to the user apparatus 2000, a notification indicating that the target user 40 does not have the access right for the target file 10.

The process that is performed by the user apparatus 2000 upon receiving the above-described notification is also arbitrarily determined. When access to the target file 10 is being made in response to a user operation, for example, the user apparatus 2000 outputs, to a display device or the like viewed by the target user 40, an error message or the like indicating that access to the target file 10 is not permitted due to a lack of the access right therefor upon receiving the above-described notification. Further, when access to the target file 10 is being made by software running on the user apparatus 2000, for example, the user apparatus 2000 notifies the software of an error indicating that the software does not have the access right for the target file 10 upon receiving the above-described notification.

Transmission of Access Request

In the user apparatus 2000, when access to the target file 10 occurs, the above-described request is transmitted to the management apparatus 4000. Therefore, the user apparatus 2000 detects that access has been made to the target file 10. Note that various well-known techniques can be used for detecting access to a file for which certain control is to be performed.

For example, the user apparatus 2000 detects access to a given file and determines whether or not that file is the target file 10. This determination can be made, for example, by referring to metadata of the accessed file. For example, a specific flag is provided in the metadata of the target file 10 (i.e., the metadata of a file for which access control is performed by the access control system 5000). When access to a file is detected, the user apparatus 2000 determines whether or not the above-described flag is contained in the metadata of that file. When the above-described flag is contained in the metadata of the accessed file, the user apparatus 2000 determines that the accessed file is the target file 10. On the other hand, when the above-described flag is not contained in the metadata of the accessed file, the user apparatus 2000 determines that the accessed file is not the target file 10.

Alternatively, whether or not the accessed file is the target file 10 may be determined by using metadata other than the above-described flag. For example, the metadata of the target file 10 may contain information indicating a reference location (which will be described later), or an encryption key used to encrypt the target file 10. In this way, it is possible to use the aforementioned information in a manner similar to that for the above-described flag.

In another example, the directory in which the target file 10 can be stored may be limited to a certain directory (hereinafter, called a target directory). In this case, when access to a file is detected, the user apparatus 2000 determines whether or not that file is stored in the target directory. When the accessed file is stored in the target directory, the user apparatus 2000 determines that the file is the target file 10. On the other hand, when the accessed file is not stored in the target directory, the user apparatus 2000 determines that the file is not the target file 10. Note that there may be a plurality of target directories.

Information defining the target directory is stored, for example, in a storage device accessible from the user apparatus 2000. In another example, in the metadata of a directory, a flag indicating that the directory is the target directory may be provided.

As to Access Right

Access rights managed by the server apparatus 3000 will be described hereinafter. An access right may be set for each user or for each group of users. Further, an access right may be individually set for each of various operations performed for a file, or collectively set for all the operations.

An access right may be set for each file or for each group of files. In the latter case, for example, an access right is set for a location (a directory) where files are stored. That is, the same access right is set for the target files 10 stored in the same directory. Note that when a sub-directory is stored in a directory for which an access right is set, it is preferable that the same access right is set for files and sub-directories stored in that sub-directory in a recursive manner.

Note that in the case where, for a given file, there are an access right individually set for this file and an access right set for a group to which this file belongs, how to handle the access to the file is arbitrarily determined. For example, only one of the two types of access rights is applied.

Note that in the case where an access right is set for a directory, the access right for a given file may be an access right that is set for a directory in which this file was stored in the past (hereinafter, called a reference location), instead of an access right that is set for a directory in which this file is currently stored. For example, assume that a target file 10 stored in a file server is copied to the user apparatus 2000. Then, after that, the user apparatus 2000 accesses the target file 10 stored in the user apparatus 2000. In this case, it is possible that the location in the file server in which the target file 10 is stored may be set as the reference location of the target file 10. In such a situation, by using the access right set for the reference location, it is possible to carry out access control based on the access right set for the location in the file server in which the target file 10 was stored even after the target file 10 is copied to the user apparatus 2000.

Figure 5:
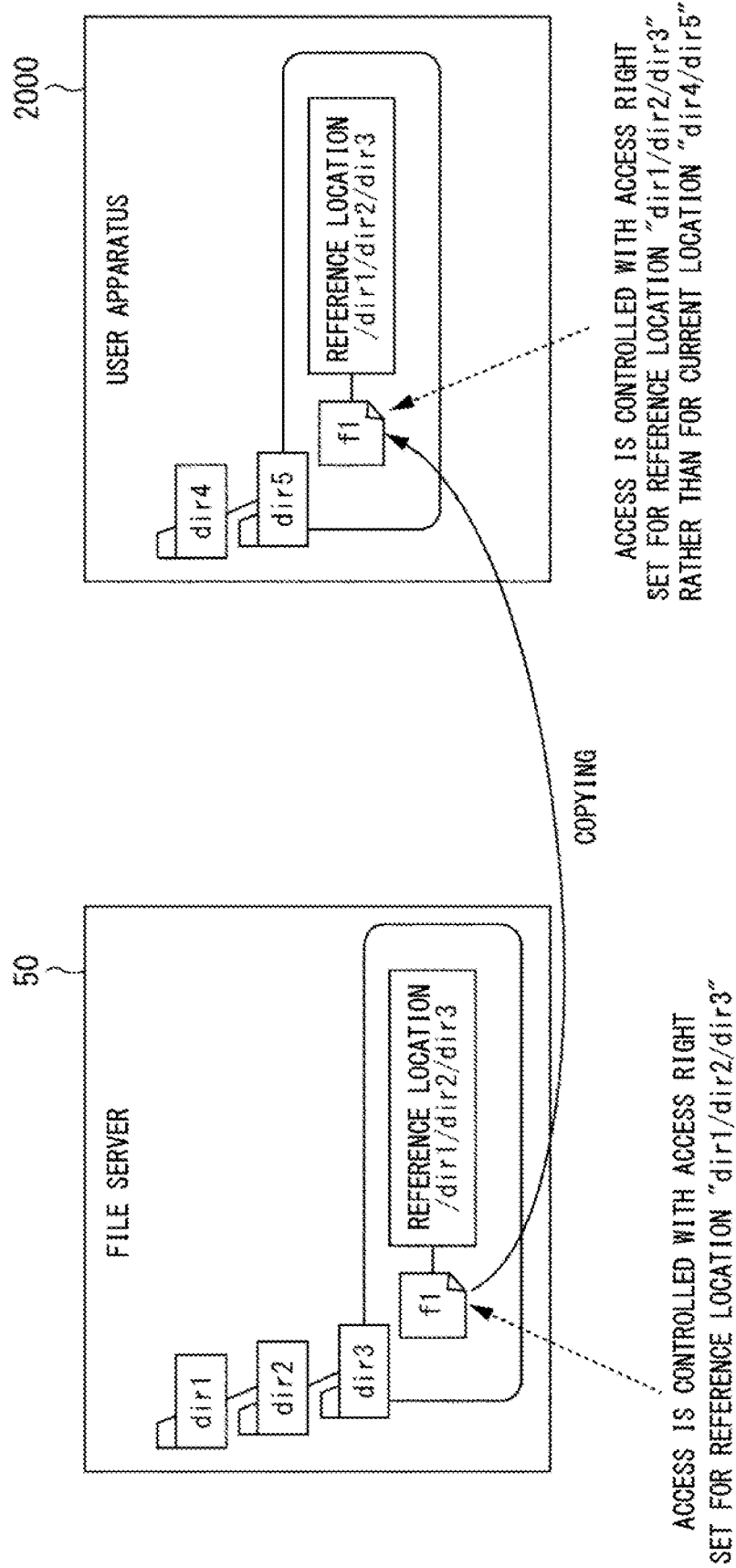
FIG. 5 is a diagram for conceptually explaining access control based on a reference location.

FIG. 5 is a diagram for conceptually explaining access control based on the reference location. In FIG. 5, a file f1 is stored in a directory "/dir1/dir2/dir3" provided in a file server 50. Further, the directory "/dir1/dir2/dir3" in the file server 50 is set as the reference location of the file f1.

Further, in FIG. 5, the file f1 has been copied from the directory "/dir1/dir2/dir3" in the file server 50 to a directory "/dir4/dir5" in the user apparatus 2000. In this case, when the target file 10 copied to the user apparatus 2000 is accessed, the access to the target file 10 is controlled based on the access right set for the directory "/dir1/dir2/dir3" in the file server 50, which is the reference location, rather than the directory "/dir4/dir5" in the user apparatus 2000, which is the location where the target file 10 is currently stored. Therefore, for example, even if the target user 40, who is operating the user apparatus 2000, has an access right for the file stored in the directory "/dir4/dir5", the target user 40 cannot access the target file 10 stored in the directory "/dir4/dir5" unless she/he has an access right for the directory "/dir1/dir2/dir3".

Further, assume that the file f1 is deleted in the file server 50. In this case, the system may be configured so that the file f1 copied to the user apparatus 2000 cannot be accessed even by the target user 40 having the access right for the reference location of the file f1. To realize the above-described operation, it is necessary to be able to find out which file in the file server 50 corresponds to the file copied to the user apparatus 2000. Various well-known methods can be adopted to realize the above-described finding of the file. For example, the path of the file in the file server 50, which is the original data of the file copied to the user apparatus 2000, is contained in the metadata of the file copied to the user apparatus 2000. Further, when it is determined whether or not the target user 40 has the access right for the target file 10, it is also determined whether or not the file in the file server 50, which is the original data of the target file 10, has been deleted. Then, when the file has already been deleted, it is determined that the target user 40 does not have the access right.

Note that the reference location of the target file 10 can be updated. For example, the right to change the reference location of the target file 10 is given to a certain user. Suppose that the target file 10 stored in the file server 50 has been moved to another directory in the file server 50 by this user in this case. In this process, for example, the file server 50 ask the user to select whether or not to change the reference location of the moved target file 10 to the directory to which the target file 10 has been moved. When it is selected to change the reference location, the server apparatus 3000 sets the directory to which the target file 10 has been moved as a new reference location of the moved target file 10. On the other hand, when it is selected not to change the reference location, the reference location is not changed. Note that the server apparatus 3000 may not ask the user to select whether or not to change the reference location. In this case, when the target file 10 is moved by the user who has the right to change the reference location, the reference location of the target file 10 is automatically changed.

Note that the system may be configured so that, the user can perform, in addition to the normal move operation, an additional move operation that involves the change of the reference location. In this case, when the normal move operation is performed for the target file 10, the reference location of the target file 10 is not changed. On the other hand, when the move operation involving the change of the reference location is performed, the reference location of the target file 10 is changed to the directory to which the target file 10 has been moved.

Note that an arbitrary method can be adopted for the method for enabling the two types of move operations, i.e., the normal move operation and the move operation involving the change of the reference location. For example, there is a possible way in which a move operation performed by using a left button of a mouse is handled as the normal move operation, while a move operation performed by using a right button of the mouse is handled as the move operation involving the change of the reference location.

Note that although the case in which the reference location is updated in response to a file being moved has been descried in the above description, the reference location may be updated in a similar manner in response to a file being copied. In this case, reference locations deferent from each other may be set for the two files containing the same contents. That is, the reference location for the original file is not changed, whereas the directory to which the file has been copied is set as the reference location for the file generated by the copy operation.

As to Access Right Information 20

The access right information 20 is information in which an access right that is set as described above is recorded. There are various specific structures of the access right information 20. For example, the access right information 20 associates 1) identification information of a user, 2) identification information (e.g., a path) of a file or directory that the user identified by the identification information can access, and 3) the type of access (read, write, execution, or the like) that the user is permitted to perform for the file or the directory with each other. In another example, the access right information 20 may associate 1) identification information of a file or directory, 2) identification information of users who can access the file or the directory, and 3) the type of access that each of the users is permitted to perform for the file or the directory.

Acquisition of Access Right Information 20

The storage processing unit 4020 acquires access right information 20 from the server apparatus 3000 (S102) and puts the acquired access right information 20 in the storage device 4100 (S104). When no access right information 20 is stored in the storage device 4100 (e.g., when the management apparatus 4000 is activated for the first time), for example, the management apparatus 4000 acquires the whole access right information 20 from the server apparatus 3000 and puts it in the storage device 4100. On the other hand, when access right information 20 is already stored in the storage device 4100, the management apparatus 4000 updates the access right information 20 stored in the storage device 4100. This is because the access right information 20 stored in the storage device 3100 might have been updated.

Various methods can be adopted as a method for updating the access right information 20 stored in the storage device 4100 as described above. For example, the storage processing unit 4020 transmits, to the server apparatus 3000, an update request that requests the updated contents of the access right information 20. Upon receiving the update request, the server apparatus 3000 transmits, to the storage processing unit 4020, a part of the access right information 20 that has been updated (hereinafter, called an updated part). The storage processing unit 4020 applies the updated part acquired from the server apparatus 3000 to the access right information 20 stored in the storage device 4100.

For example, the storage processing unit 4020 repeatedly transmits update requests at a predetermined frequency. This predetermined frequency may be a fixed value or may be changed. In the latter case, for example, the more frequently the request acquisition unit 4040 acquires access requests (i.e., the more frequently the access to the target file 10 occurs), the more frequently the storage processing unit 4020 transmits update requests.

The update of the access right information 20 may be performed on the initiative of the server apparatus 3000 (i.e., performed without any update request from the storage processing unit 4020). In this case, for example, the server apparatus 3000 transmits updated parts of the access right information 20 to the storage processing unit 4020 at a predetermined frequency. Upon receiving the updated part of the access right information 20 from the server apparatus 3000, the storage processing unit 4020 applies the updated part to the access right information 20 stored in the storage device 4100.

The frequency at which the server apparatus 3000 transmits updated parts of the access right information 20 may also be a fixed value or may be changed like the frequency at which the storage processing unit 4020 transmits update requests. In the latter case, for example, the more frequently the server apparatus 3000 updates the access right information 20 stored in the storage device 3100, the more frequently it transmits updated parts of the access right information 20 to the management apparatus 4000.

In another example, each time the access right information 20 stored in the storage device 3100 is updated, the server apparatus 3000 may transmit the updated contents thereof to the management apparatus 4000.

Acquisition of Access Request and Determination of Access Right: S202 and S204

The request acquisition unit 4040 acquires an access request from the user apparatus 2000 (S202). Then, the determination unit 4060 determines whether or not the target user 40 has an access right for the target file 10 (S204). Note that the access request contains information necessary for determining whether or not the target user 40 has an access right for the target file 10. The access request will be described hereinafter in detail.

For example, the access request contains identification information of the target user 40, identification information of the target file 10, and the type of access. In this case, for example, the determination unit 4060 determines whether or not access to the target file 10 by the target user 40 is permitted by comparing association of "the identification information of the target user 40, the identification information of the target file 10, and the type of access" indicated in the access request with association of "identification information of a user, identification information of a file or a directory, and the type of permitted access" indicated in the access right information 20.

The method for realizing the above-described comparison is arbitrarily determined. For example, the determination unit 4060 specifies the type of access that the target user 40 is permitted for the target file 10 by searching the access right information 20 stored in the storage device 4100 by using the combination of "the identification information of the target user 40, and the identification information of the target file 10" indicated in the request. Then, the determination unit 4060 determines whether or not the type of access indicated in the access request is included in the type of access that the target user 40 is permitted for the target file 10. When the type of access indicated in the access request is included in the type of permitted access, the determination unit 4060 determines that "the target user 40 has the access right". On the other hand, when the type of access indicated in the access request is not included in the type of permitted access, the determination unit 4060 determines that "the target user 40 does not have the access right".

Note that, as described above, there are cases where the reference location is used for the determination of an access right. In this case, the reference location is used instead of the identification information of the target file 10 in the above-described method. In this case, for example, a combination of "the identification information of the target user 40, the reference location, and the type of access" is contained in the access request. The determination unit 4060 specifies the type of access that the target user 40 is permitted for the target file 10 by searching the access right information 20 stored in the storage device 4100 by using the combination of "the identification information of the target user 40 and the reference location" indicated in the access request. When the type of access indicated in the access request is included in the type of access that the target user 40 is permitted for the reference location, a determination result indicating that "the target user 40 has the access right" is obtained. On the other hand, when the type of access indicated in the access request is not included in the type of access that the target user 40 is permitted for the reference location, a determination result indicating that "the target user 40 does not have the access right" is obtained.

Decryption of Target File 10: S206

When it is determined that the target user 40 has the access right (S204: Yes), the output unit 4080 outputs key information of the target file 10 to the user apparatus 2000 (S206). The user apparatus 2000 decrypts the target file 10 by using the key information output from the output unit 4080.

The key information may be 1) a decryption key used to decrypt the target file 10, or 2) information that can be used to generate the decryption key. An example of each of these cases will be shown hereinafter in detail.

Case of 1

For example, in the case 1), the management apparatus 4000 transmits, as a response to the access request, key information containing a decryption key for decrypting the target file 10 to the user apparatus 2000. Assume that, for example, the decryption key for decrypting the target file 10 can be generated from the encryption key used to encrypt the target file 10. In this case, the encryption key used to encrypt the target file 10 is contained in the access request. The output unit 4080 generates a decryption key from the encryption key contained in the access request, generates key information containing the generated decryption key, and transmits the generated key information to the user apparatus 2000.

Note that in order to include the encryption key used to encrypt the target file 10 in the access request, the user apparatus 2000 needs to be able to acquire the encryption key. The method for acquiring the encryption key is arbitrarily determined. For example, the encryption key used to encrypt the target file 10 is stored together with the target file 10 in a storage device accessible from the user apparatus 2000 (e.g., stored as one of the metadata of the target file 10). In this case, the user apparatus 2000 acquires the encryption key that is stored in association with the target file 10 by accessing the aforementioned storage device.

Note that the data used to generate the decryption key is not limited to the encryption key and can be any data.

Further, the decryption key corresponding to the encryption key may be stored in advance in a storage device accessible from the management apparatus 4000. In this case, the management apparatus 4000 acquires the decryption key by searching the aforementioned storage device by using the encryption key contained in the access request, and transmits key information containing the acquired decryption key to the user apparatus 2000.

The user apparatus 2000 decrypts the target file 10 by using the decryption key contained in the key information which has been acquired by any of the above-described various methods. Note that well-known techniques can be used for the technique for decrypting an encrypted file by using a decryption key.

Case of 2

In this case, the user apparatus 2000 has a function of obtaining a decryption key by using key information. Assume that, for example, a decryption key can be generated from an encryption key as described above. For example, in this case, the identification information of the target file 10 and the encryption key used to encrypt the target file 10 are associated with each other and stored in a storage device accessible from the management apparatus 4000. Further, the identification information of the target file 10 is contained in the access request.

The output unit 4080 acquires an encryption key corresponding to the identification information of the target file 10 contained in the access request from the above-described storage device, and generates key information containing the acquired encryption key. Then, the output unit 4080 transmits the generated key information to the user apparatus 2000.

The user apparatus 2000 generates a decryption key from the encryption key contained in the key information provided from the management apparatus 4000. Then the user apparatus 2000 decrypts the target file 10 by using the generated decryption key.

Processing after Decryption

The user apparatus 2000 can access the decrypted target file 10. For example, when the operation performed for the target file 10 is a read, the user apparatus 2000 can read the contents of the decrypted target file 10. Further, for example, when the operation performed for the target file 10 is a write, the user apparatus 2000 can make a change to the contents of the decrypted target file 10.

Specific Example of Implementation of Access Control System 5000

In order to further facilitate the understanding of the access control system 5000, a specific example of the implementation of the access control system 5000 will be described hereinafter. However, the example of the implementation described below is merely an example of a specific embodiment of the access control system 5000, and the specific method for implementing the access control system 5000 is not limited to the example described below.

Figure 6:
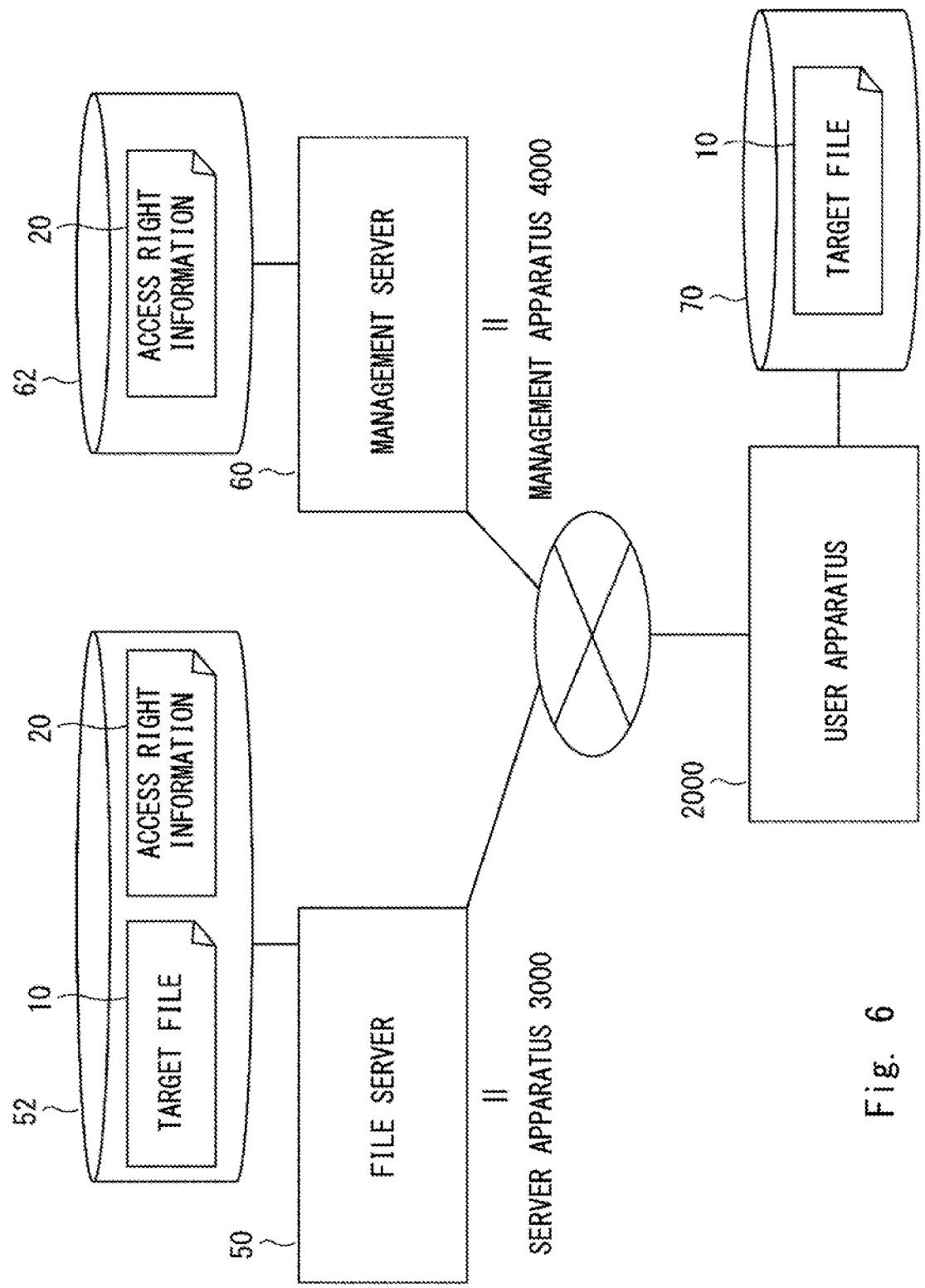
FIG. 6 shows a specific example of implementation of an access control system.

FIG. 6 shows a specific example of the implementation of the access control system 5000. In this example of the implementation, a file server 50 and a management server 60 are provided as apparatuses that function as the server apparatus 3000 and the management apparatus 4000, respectively. In the example shown below, the access control for the target file 10 is performed based on the reference location set for the target file 10. Further, the decryption key for the target file 10 is generated by using the encryption key used to encrypt the target file 10.

The file server 50 accepts the upload of a file. The file uploaded to the file server 50 is subject to access control performed by the access control system 5000 (i.e., regarded as the target file 10). For example, the target file 10 is uploaded from the user apparatus 2000.

The target file 10 uploaded to the file server 50 is put in a storage device 52. Note that the target file 10 to be put in the storage device 52 is encrypted by the management server 60. For example, the management server 60 acquires the target file 10 uploaded from the user apparatus 2000 to the file server 50, and encrypts the acquired target file 10. When doing so, the management server 60 adds an encryption key to the metadata of the file. The management server 60 transmits the encrypted target file 10 to the file server 50.

The file server 50 puts the target file 10 received from the management server 60 in the storage device 52. Note that the directory in which the target file 10 to be stored is designated by the user apparatus 2000, which has uploaded the target file 10. The file server 50 adds data representing the reference location to the metadata of the target file 10 to be stored in the storage device 52. The reference location in this process represents the path of the directory in which the target file 10 is to be stored.

The user apparatus 2000 can access the target file 10 managed by the file server 50 (i.e., stored in the storage device 52). Further, the user apparatus 2000 can also download the target file 10 managed by the file server 50 and put the downloaded target file 10 in a storage device 70 accessible from the user apparatus 2000. Note that since the access control is performed based on the reference location as described above, the access control for the downloaded target file 10 can be also performed based on the reference location.

In this example, the storage device 52 corresponds to the storage device 3100, and the storage device 62 corresponds to the storage device 4100. Therefore, the access right information 20 is stored in the storage device 52 of the file server 50. Further, the management server 60 acquires the access right information 20 from the file server 50 in advance and puts the acquired access right information 20 in the storage device 62. Further, the management server 60 updates the access right information 20 stored in the storage device 62 by any of the above-described various methods.

Figure 7:
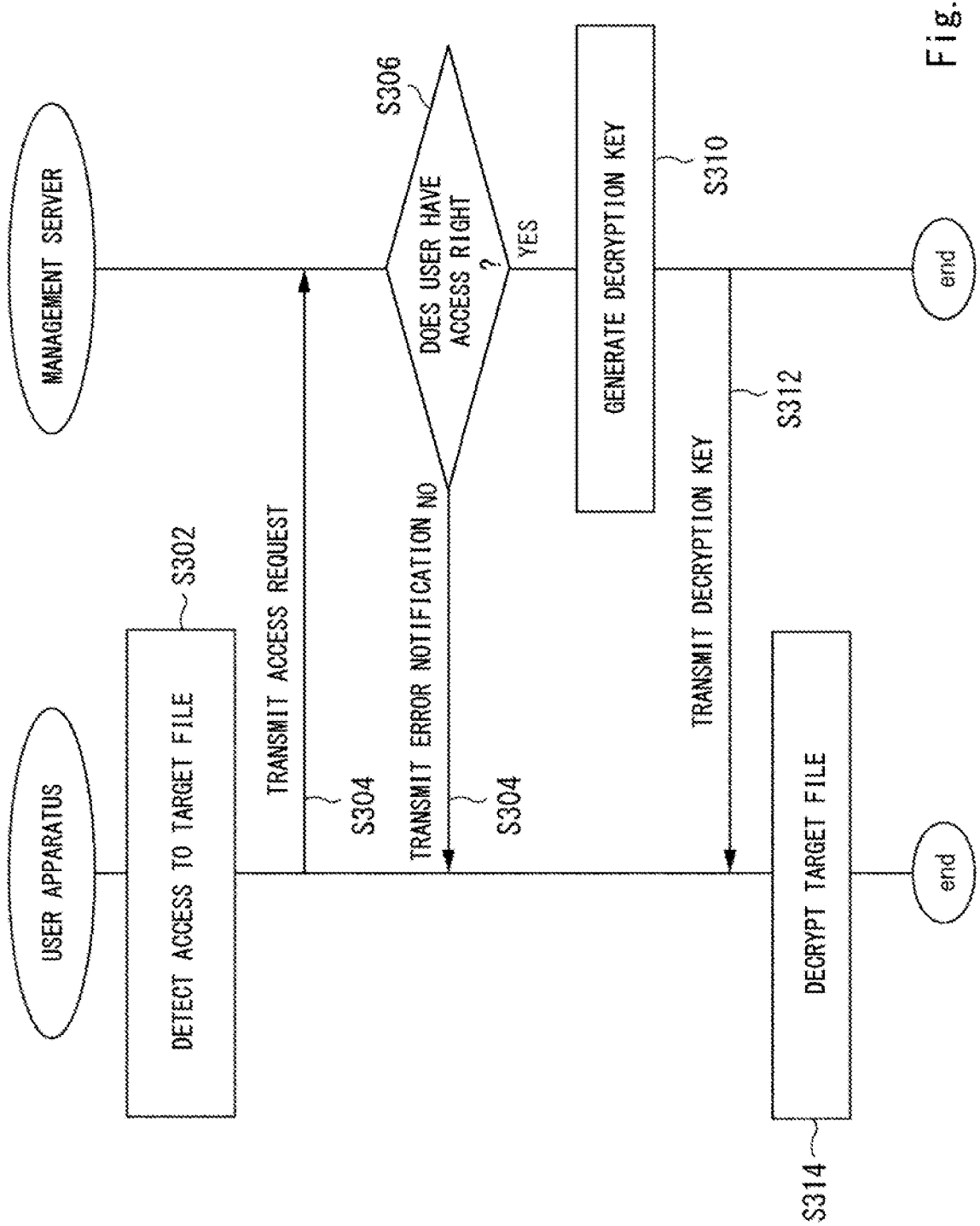
FIG. 7 shows an example of a flow of access control performed in the example of the implementation of the access control system.

For example, the access control is performed along the below-described flow. FIG. 7 shows an example of a flow of access control performed in the example of the implementation of the access control system 5000. The user apparatus 2000 detects access to the target file 10 (S302). The user apparatus 2000 transmits, to the management server 60, an access request indicating "the identification information of the target user 40, the reference location stored in the metadata of the target file 10, the type of detected access, and the encryption key used to encrypt the target file 10" (S304).

In response to the access request, the management server 60 determines whether or not the target user 40 has an access right for the target file 10 by using the access right information 20 stored in the storage device 62 (S306). Note that the access right information 20 indicates association of "the identification information of the user, the identification information of the file or the directory, and the type of permitted access". The management server 60 determines whether or not the target user 40 has the access right by comparing the contents of the access request with the access right information 20 stored in the storage device 62. The specific determination method is the same as that described above.

When the target file 10 does not have the access right (S306: No), the management server 60 transmits a response indicating an error to the user apparatus 2000 (S308). On the other hand, when the target file 10 has the access right (S306: Yes), the management server 60 generates a decryption key from the encryption key contained in the access request (S308). Then, the management server 60 transmits, as a response to the access request, key information containing the generated decryption key to the user apparatus 2000 (S310). The user apparatus 2000 decrypts the target file 10 by using the received key information (S312).

Although the present invention is described above with reference to example embodiments, the present invention is not limited to the above-described example embodiments. Various modifications that can be understood by those skilled in the art can be made to the configuration and details of the present invention within the scope of the invention.

Note that, in the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM, CD-R, CD-R/W, and semiconductor memories (such as mask ROM, PROM (Programmable ROM), EPROM (Erasable PROM), flash ROM, RAM, etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the embodiments disclosed above can be described as, but not limited to, the following supplementary notes.

Supplementary Note 1

A management apparatus comprising:
a storage processing unit configured to acquire access right information from a server apparatus configured to manage the access right information, and put the acquired access right information in a second storage device, the access right information indicating an access right of a user for each file stored in an encrypted state in a first storage device;
an acquisition unit configured to acquire a request for key information that is used to decrypt a target file from a user apparatus operated by a target user;
a determination unit configured to determine, upon the acquisition of the request, whether or not the target user has an access right for the target file by using the access right information stored in the second storage device; and
an output unit configured to output the key information to the user apparatus when it is determined that the target user has the access right for the target file.

Supplementary Note 2

The management apparatus according to claim 1, wherein the storage processing unit acquires the access right information updated in the server apparatus by accessing the server apparatus, and updates the access right information stored in the second storage device with the acquired access right information.

Supplementary Note 3

The management apparatus described in Supplementary note 1, wherein when the access right information is updated in the server apparatus, the storage processing unit updates the access right information stored in the second storage device by acquiring the access right transmitted from the server apparatus.

Supplementary Note 4

The management apparatus according to any one of claims 1 to 3,
wherein an encryption key used to encrypt the target file is contained in the request, and
wherein the output unit generates a decryption key for decrypting the target file by using the encryption key, and outputs key information containing the generated decryption key.

Supplementary Note 5

The management apparatus according to any one of claims 1 to 4,
wherein in the access right information, the access right of the target user for the target file is determined based on a reference location, the reference location being a location where the target file was stored at a predetermined point in time that is earlier than a point in time when the process by the determination unit is performed,
wherein reference location information indicating the reference location of the target file is contained in the request, and
wherein the determination unit determines whether or not the target user has the access right for the target file by using the access right information and the reference location information.

Supplementary Note 6

The management apparatus according to any one of claims 1 to 5, wherein the server apparatus is a file server.

Supplementary Note 7

A control method performed by a management apparatus, comprising:
a storage processing step of acquiring access right information from a server apparatus configured to manage the access right information, and putting the acquired access right information in a second storage device, the access right information indicating an access right of a user for each file stored in an encrypted state in a first storage device;
an acquisition step of acquiring a request for key information that is used to decrypt a target file from a user apparatus operated by a target user;
a determination step of determining, upon the acquisition of the request, whether or not the target user has an access right for the target file by using the access right information stored in the second storage device; and
an output step of outputting the key information to the user apparatus when it is determined that the target user has the access right for the target file.

Supplementary Note 8

The control method according to claim 7, wherein, in the storage processing step, the access right information updated in the server apparatus is acquired by accessing the server apparatus, and the access right information stored in the second storage device is updated with the acquired access right information.

Supplementary Note 9

The control method according to claim 7, wherein, in the storage processing step, when the access right information is updated in the server apparatus, the access right information stored in the second storage device is updated by acquiring the access right transmitted from the server apparatus.

Supplementary Note 10

The control method according to any one of claims 7 to 9,
wherein an encryption key used to encrypt the target file is contained in the request, and
wherein in the output step, a decryption key for decrypting the target file is generated by using the encryption key, and key information containing the generated decryption key is output.

Supplementary Note 11

The control method according to any one of claims 7 to 10,
wherein in the access right information, the access right of the target user for the target file is determined based on a reference location, the reference location being a location where the target file was stored at a predetermined point in time that is earlier than a point in time when the process in the determination step is performed,
wherein reference location information indicating the reference location of the target file is contained in the request, and
wherein in the determination step, it is determined whether or not the target user has the access right for the target file by using the access right information and the reference location information.

Supplementary Note 12

The control method according to any one of claims 7 to 11, wherein the server apparatus is a file server.

Supplementary Note 13

A computer readable medium storing a program that causes a management apparatus to perform,
a storage processing step of acquiring access right information from a server apparatus configured to manage the access right information, and putting the acquired access right information in a second storage device, the access right information indicating an access right of a user for each file stored in an encrypted state in a first storage device;
an acquisition step of acquiring a request for key information that is used to decrypt a target file from a user apparatus operated by a target user;
a determination step of determining, upon the acquisition of the request, whether or not the target user has an access right for the target file by using the access right information stored in the second storage device; and
an output step of outputting the key information to the user apparatus when it is determined that the target user has the access right for the target file.

Supplementary Note 14

The computer readable medium according to claim 13, wherein, in the storage processing step, the access right information updated in the server apparatus is acquired by accessing the server apparatus, and the access right information stored in the second storage device is updated with the acquired access right information.

Supplementary Note 15

The computer readable medium according to claim 13, wherein, in the storage processing step, when the access right information is updated in the server apparatus, the access right information stored in the second storage device is updated by acquiring the access right transmitted from the server apparatus.

Supplementary Note 16

The computer readable medium according to any one of claims 13 to 15,
wherein an encryption key used to encrypt the target file is contained in the request, and
wherein in the control method, a decryption key for decrypting the target file is generated by using the encryption key, and key information containing the generated decryption key is output.

Supplementary Note 17

The computer readable medium according to any one of claims 13 to 16,
wherein in the access right information, the access right of the target user for the target file is determined based on a reference location, the reference location being a location where the target file was stored at a predetermined time that is earlier than a time when the process in the determination step is performed,
wherein reference location information indicating the reference location of the target file is contained in the request, and
wherein in the determination step, it is determined whether or not the target user has the access right for the target file by using the access right information and the reference location information.

Supplementary Note 18

The computer readable medium according to any one of claims 13 to 17, wherein the server apparatus is a file server.

Supplementary Note 19

An access control system comprising a user apparatus, a server apparatus, and a management apparatus,
wherein the user apparatus transmits a request for key information that is used to decrypt a target file accessed by a target user,
wherein the management apparatus comprises:
a storage processing unit configured to acquire access right information from the server apparatus and put the acquired access right information in a second storage device, the access right information indicating an access right of a user for each file stored in an encrypted state in a first storage device;
an acquisition unit configured to acquire the request from the user apparatus;
a determination unit configured to determine, upon the acquisition of the request, whether or not the target user has an access right for the target file by using the access right information stored in the second storage device; and an output unit configured to output the key information to the user apparatus when it is determined that the target user has the access right for the target file, and wherein the user apparatus decrypts the target file by using the key information output from the management apparatus.

Supplementary Note 20

The access control system according to claim 19,
wherein the storage processing unit transmits, to the server apparatus, a request for updated access right information,
wherein the server apparatus transmits, upon receiving the request transmitted from the storage processing unit, the updated access right information to the management apparatus, and
wherein the storage processing unit updates the access right information stored in the second storage device with the access right information transmitted from the server apparatus.

Supplementary Note 21

The access control system according to claim 19,
wherein when the access right information is updated, the server apparatus transmits the updated access right information to the management apparatus, and
wherein the storage processing unit updates the access right information stored in the second storage device by acquiring the access right transmitted from the server apparatus.

Supplementary Note 22

The access control system according to any one of claims 19 to 21,
wherein an encryption key used to encrypt the target file is contained in the request, and
wherein the output unit generates a decryption key for decrypting the target file by using the encryption key, and outputs key information containing the generated decryption key, and
wherein the user apparatus decrypts the target file by using the decryption key contained in the key information.

Supplementary Note 23

The access control system according to any one of claims 19 to 22,
wherein in the access right information, the access right of the target user for the target file is determined based on a reference location, the reference location being a location where the target file was stored at a predetermined point in time that is earlier than a point in time when the process by the determination unit is performed,
wherein reference location information indicating the reference location of the target file is contained in the request, and
wherein the determination unit determines whether or not the target user has the access right for the target file by using the access right information and the reference location information.

Supplementary Note 24

The access control system according to any one of claims 19 to 23, wherein the server apparatus is a file server.

REFERENCE SIGNS LIST

10 TARGET FILE
20 ACCESS RIGHT INFORMATION
40 TARGET USER
50 FILE SERVER
52 STORAGE DEVICE
60 MANAGEMENT SERVER
62 STORAGE DEVICE
70 STORAGE DEVICE
500 COMPUTER
502 BUS
504 PROCESSOR
506 MEMORY
508 STORAGE DEVICE
510 INPUT/OUTPUT INTERFACE
512 NETWORK INTERFACE
2000 USER APPARATUS
3000 SERVER APPARATUS
3100 STORAGE DEVICE
4000 MANAGEMENT APPARATUS
4020 STORAGE PROCESSING UNIT
4040 REQUEST ACQUISITION UNIT
4060 DETERMINATION UNIT
4080 OUTPUT UNIT
4100 STORAGE DEVICE
5000 ACCESS CONTROL SYSTEM

The invention claimed is:

1. A management apparatus comprising:
at least one memory that stores instructions; and
at least one processor that is configured to execute the instructions to:
acquire access right information from a server apparatus configured to manage the access right information, the access right information indicating an access right of a user for each file stored in an encrypted state in a first storage device;
put the acquired access right information in a second storage device;
acquire a request for key information that is used to decrypt a target file from a user apparatus operated by a target user;
determine, upon the acquisition of the request, whether or not the target user has an access right for the target file by using the access right information stored in the second storage device;
output the key information to the user apparatus when it is determined that the target user has the access right for the target file; and
when the access right information is updated in the server apparatus, update the access right information stored in the second storage device by acquiring the access right transmitted from the server apparatus.

2. The management apparatus according to claim 1, wherein the at least one processor is configured further to:
acquire the access right information updated in the server apparatus by accessing the server apparatus; and
update the access right information stored in the second storage device with the acquired access right information.

3. The management apparatus according to claim 1,
wherein an encryption key used to encrypt the target file is contained in the request, and
wherein the output of the key information includes:
   generating a decryption key for decrypting the target file by using the encryption key; and
   outputting key information containing the generated decryption key.

4. The management apparatus according to claim 1,
wherein in the access right information, the access right of the target user for the target file is determined based on a reference location, the reference location being a location where the target file was stored at a predetermined point in time that is earlier than a point in time when whether or not the user has an access right for the target file is determined,
wherein reference location information indicating the reference location of the target file is contained in the request, and
wherein whether or not the target user has the access right for the target file is determined by using the access right information and the reference location information.

5. The management apparatus according to claim 1, wherein the server apparatus is a file server.

6. A control method performed by a management apparatus, comprising:
   acquiring access right information from a server apparatus configured to manage the access right information, the access right information indicating an access right of a user for each file stored in an encrypted state in a first storage device;
   putting the acquired access right information in a second storage device;
   acquiring a request for key information that is used to decrypt a target file from a user apparatus operated by a target user;
   determining, upon the acquisition of the request, whether or not the target user has an access right for the target file by using the access right information stored in the second storage device;
   outputting the key information to the user apparatus when it is determined that the target user has the access right for the target file; and
   when the access right information is updated in the server apparatus, the access right information stored in the second storage device is updated by acquiring the access right transmitted from the server apparatus.

7. The control method according to claim 6, wherein the access right information updated in the server apparatus is acquired by accessing the server apparatus, and the access right information stored in the second storage device is updated with the acquired access right information.

8. The control method according to claim 6,
wherein an encryption key used to encrypt the target file is contained in the request, and
wherein a decryption key for decrypting the target file is generated by using the encryption key, and key information containing the generated decryption key is output.

9. The control method according to claim 6,
wherein in the access right information, the access right of the target user for the target file is determined based on a reference location, the reference location being a location where the target file was stored at a predetermined point in time that is earlier than a point in time when whether or not the user has an access right for the target file,
wherein reference location information indicating the reference location of the target file is contained in the request, and
wherein whether or not the target user has the access right for the target file is determined by using the access right information and the reference location information.

10. The control method according to claim 6, wherein the server apparatus is a file server.

11. A non-transitory computer readable medium storing a program that causes a management apparatus to perform:
   acquiring access right information from a server apparatus configured to manage the access right information, the access right information indicating an access right of a user for each file stored in an encrypted state in a first storage device;
   putting the acquired access right information in a second storage device;
   acquiring a request for key information that is used to decrypt a target file from a user apparatus operated by a target user;
   determining, upon the acquisition of the request, whether or not the target user has an access right for the target file by using the access right information stored in the second storage device;
   outputting the key information to the user apparatus when it is determined that the target user has the access right for the target file; and
   when the access right information is updated in the server apparatus, the access right information stored in the second storage device is updated by acquiring the access right transmitted from the server apparatus.

12. The computer readable medium according to claim 11, wherein the access right information updated in the server apparatus is acquired by accessing the server apparatus, and the access right information stored in the second storage device is updated with the acquired access right information.

13. The computer readable medium according to claim 11,
wherein an encryption key used to encrypt the target file is contained in the request, and
wherein a decryption key for decrypting the target file is generated by using the encryption key, and key information containing the generated decryption key is output.

14. The computer readable medium according to claim 11,
wherein in the access right information, the access right of the target user for the target file is determined based on a reference location, the reference location being a location where the target file was stored at a predetermined time that is earlier than a time when whether or not the user has an access right for the target file is determined,
wherein reference location information indicating the reference location of the target file is contained in the request, and
wherein whether or not the target user has the access right for the target file is determined by using the access right information and the reference location information.

15. The computer readable medium according to claim 11, wherein the server apparatus is a file server.

16. An access control system comprising a user apparatus, a server apparatus, and a management apparatus,
wherein the user apparatus comprises at least one memory that stores instructions and at least one processor that is configured to execute the instructions to transmit a request for key information that is used to decrypt a target file accessed by a target user, wherein the management apparatus comprises at least one memory that stores instructions and at least one processor that is configured to execute the instructions to:

acquire access right information from the server apparatus, the access right information indicating an access right of a user for each file stored in an encrypted state in a first storage device;

put the acquired access right information in a second storage device;

acquire the request from the user apparatus;

determine, upon the acquisition of the request, whether or not the target user has an access right for the target file by using the access right information stored in the second storage device; and output the key information to the user apparatus when it is determined that the target user has the access right for the target file, wherein the user apparatus comprises at least one memory that stores instructions and at least one processor that is configured to execute the instructions to decrypt the target file by using the key information output from the management apparatus, wherein the at least one processor of the server apparatus is configured further to, when the access right information is updated, transmit the updated access right information to the management apparatus, and wherein the at least one processor of the management apparatus is configured further to update the access right information stored in the second storage device by acquiring the access right transmitted from the server apparatus.

17. The access control system according to claim 16, wherein the at least one processor of the management apparatus is configured further to transmit, to the server apparatus, a request for updated access right information, wherein the at least one processor of the server apparatus is configured further to transmit, upon receiving the request transmitted from the management apparatus, the updated access right information to the management apparatus, and wherein the at least one processor of the management apparatus is configured further to update the access right information stored in the second storage device with the access right information transmitted from the server apparatus.

18. The access control system according to claim 16, wherein an encryption key used to encrypt the target file is contained in the request, and wherein the at least one processor of the management apparatus is configured further to generate a decryption key for decrypting the target file by using the encryption key, and output key information containing the generated decryption key, and wherein the at least one processor of the user apparatus is configured further to decrypt the target file by using the decryption key contained in the key information.

19. The access control system according to claim 16, wherein in the access right information, the access right of the target user for the target file is determined based on a reference location, the reference location being a location where the target file was stored at a predetermined point in time that is earlier than a point in time when the process by the determination unit is performed, wherein reference location information indicating the reference location of the target file is contained in the request, and wherein whether or not the target user has the access right for the target file is determined by using the access right information and the reference location information.

20. The access control system according to claim 16, wherein the server apparatus is a file server.

* * * * *